(12) United States Patent
Tao

(10) Patent No.: US 11,485,614 B2
(45) Date of Patent: Nov. 1, 2022

(54) CORNER ATTACHMENT ASSEMBLIES FOR SUSPENDED PAYLOAD CONTAINERS OF AIRCRAFTS

(71) Applicant: Aurora Flight Sciences Corporation, a subsidiary of The Boeing Company, Manassas, VA (US)

(72) Inventor: Tony Shuo Tao, Somerville, MA (US)

(73) Assignee: Aurora Flight Sciences Corporation, a subsidiary of The Boeing Company, Manassas, VA (US)

( * ) Notice: Subject to any disclaimer, the term of this patent is extended or adjusted under 35 U.S.C. 154(b) by 354 days.

(21) Appl. No.: 16/890,333

(22) Filed: Jun. 2, 2020

(65) Prior Publication Data

US 2021/0371251 A1 Dec. 2, 2021

(51) Int. Cl.
| | |
|---|---|
| *B66C 1/62* | (2006.01) |
| *B66C 1/10* | (2006.01) |
| *B66C 1/42* | (2006.01) |
| *B64D 1/22* | (2006.01) |
| *B64C 39/02* | (2006.01) |

(52) U.S. Cl.
CPC ............... *B66C 1/62* (2013.01); *B64D 1/22* (2013.01); *B66C 1/101* (2013.01); *B66C 1/42* (2013.01); *B64C 39/024* (2013.01); *B64C 2201/104* (2013.01); *B64C 2201/108* (2013.01); *B64C 2201/128* (2013.01)

(58) Field of Classification Search
CPC .. B66C 1/62; B66C 1/101; B66C 1/42; B64D 1/22; B64C 39/024; B64C 2201/104; B64C 2201/108; B64C 2201/128
See application file for complete search history.

(56) References Cited

U.S. PATENT DOCUMENTS

| | | | | |
|---|---|---|---|---|
| 3,223,358 A | | 12/1965 | Quick | |
| 4,925,226 A | * | 5/1990 | Leonard, Jr. ............ | B66C 1/663 294/102.1 |
| 7,810,861 B1 | * | 10/2010 | Heinrichs ................. | B66C 1/16 294/67.4 |

(Continued)

FOREIGN PATENT DOCUMENTS

| | | | |
|---|---|---|---|
| CN | 107651197 A | * | 2/2018 |
| WO | WO-2021201747 A1 | * | 10/2021 |

*Primary Examiner* — Justin M Benedik
(74) *Attorney, Agent, or Firm* — Quinn IP Law

(57) ABSTRACT

Presented are corner attachment assemblies for cargo suspension systems, methods for making/using such assemblies, and aircraft equipped with underbody suspension systems using corner attachment assemblies for securing payload containers. Mounting assemblies are presented for securing objects to tether cables of suspension systems. A representative cargo mounting assembly includes a pair of shoulder clamps, each of which includes a flap that projects from a cup. Each shoulder clamp flap mechanically attaches, e.g., via a flap through-hole with a structurally reinforcing grommet, to a respective segment of a tether cable of a cargo suspension system. In addition, each shoulder clamp cup includes multiple noncoplanar, mutually adjoining contact surfaces. For instance, the cup may have a tetrahedral geometry with three mutually orthogonal, triangular-shaped contact surfaces. Each contact surface attaches, e.g., via a high-strength adhesive, to a respective surface of a corner of a cargo container.

20 Claims, 5 Drawing Sheets

(56) References Cited

U.S. PATENT DOCUMENTS

| | | |
|---|---|---|
| 9,346,547 B2 | 5/2016 | Patrick et al. |
| 9,422,139 B1 | 8/2016 | Bialkowski et al. |
| 9,663,245 B2 | 5/2017 | Zhao et al. |
| 9,676,481 B1 | 6/2017 | Buchmueller |
| 9,969,494 B1 | 5/2018 | Buchmueller et al. |
| 2012/0168397 A1 | 7/2012 | Lim et al. |
| 2013/0051782 A1 | 2/2013 | Dimotakis |
| 2015/0331427 A1 | 11/2015 | Chaudary |
| 2017/0106978 A1 | 4/2017 | Sopper et al. |

\* cited by examiner

CORNER ATTACHMENT ASSEMBLIES FOR SUSPENDED PAYLOAD CONTAINERS OF AIRCRAFTS

TECHNICAL FIELD

The present disclosure relates generally to payload suspension systems of aircraft. More specifically, aspects of this disclosure relate to systems, methods and devices for suspending payload containers from airframes of rotary-wing aircraft.

BACKGROUND

Fixed-wing aircraft, such as airplanes and gliders, achieve flight using wings that are immovably attached to the aircraft's airframe and generate aerodynamic lift through a positive angle of attack during forward travel through the air. The wing's airfoil cross-section deflects air downward as the aircraft is propelled forward; this produces a dynamic pressure-gradient on the wing that, in turn, lifts and buoys the airplane during flight. In contrast to conventional fixed-wing aircraft, vertical takeoff and landing (VTOL) aircraft, as the name implies, are capable of vertical takeoffs and landings as well as intermittent hovering flight. The most recognizable example of VTOL aircraft is the helicopter, which is a rotary-wing aircraft (rotorcraft) with engine-driven rotor blades that provide lift and thrust to the aircraft. Tiltwing and tiltrotor aircraft are hybrid-type VTOL that incorporate features of both fixed-wing and rotary-wing vehicles for flight operations.

Many modern-day aircraft—be they fixed-wing, rotary-wing, or hybrids of the two—eliminate the need for an in-vehicle human pilot to operate the aircraft during flight. An unmanned aerial vehicle (UAV), for example, is an aircraft without manual flight controls or a flight deck from which a pilot controls the aircraft. A UAV, or "drone" as it is colloquially known, may operate with various degrees of autonomy, ranging from predominantly manual control to fully autonomous control and therebetween in partially automated flight control architectures. Remote-piloted UAVs are part of an unmanned aircraft system (UAS) that employs a resident computer control system that is wirelessly connected to a land-based ground control station for piloting the aircraft. Handheld UAVs are radio-controlled (RC) aircraft that are smaller than a bookcase and manually operated by a handheld controller. Commercial-class UAVs, in contrast, have built-in control and guidance systems to provision speed control, flight stabilization, and navigation functions.

Conventional aircraft and modern-day UAVs are frequently employed to transport a variety of different payloads to assorted destinations. Many VTOL aircraft, for example, are originally equipped with or retrofitted to include a payload suspension system for quickly and efficiently airlifting payloads. To accommodate such delivery operations, the payload or its container may be specifically designed to easily and safely attach to a drop-down tether cable of a drone's payload suspension system. Alternatively, the VTOL may employ a "universal" payload suspension system designed to accommodate containers of varying shapes and sizes. In either case, the payload container must be suspended in a manner that ensures secure attachment to avoid involuntary jettisoning of the payload, while at the same time minimizing inadvertent load movement and oscillation to ensure aircraft control and maneuverability during flight.

SUMMARY

Presented herein are corner attachment assemblies for cargo suspension systems, methods for making and methods for using such corner attachment assemblies, and aircraft equipped with payload suspension systems using corner attachment assemblies for securing payload containers. By way of example, a loading/unloading attachment assembly is presented that adheres to diagonally opposite corners of a payload container and removably mounts the container to an aircraft suspension cable (or "tether"). The attachment assembly employs two or more shoulder clamps, each of which includes: an attachable cup portion that adheres to a respective corner portion of a payload container, and a suspension flap portion with a grommet, e.g., that affixes to a drop-down tether cable or hook of an aircraft's payload suspension system. The attachable cup portion may take on the form of a conformable sticker with a tetrahedral geometry that mounts generally flush against the three surfaces of a corner of a polyhedral container. The suspension flap portion may be integrally formed with and adjoin the attachable cup portion, projecting obliquely from a top-most horizontal segment of the cup portion. It may be desirable that the shoulder clamp be fabricated as a single-piece structure that is molded or printed from a polymeric material or cut and folded from a cardboard-based paper material. With this configuration, the payload weight is transmitted through the clamps and distributed through the tether cable in a manner that "cinches" the cup portions to the container.

Aspects of this disclosure are directed to corner attachment assemblies for securely tethering cargo to cargo suspension systems. For instance, mounting assemblies are presented for securing objects to tether cables of suspension systems. A representative cargo mounting assembly includes a pair of shoulder clamps, each of which includes a flap that projects from a cup. Each shoulder clamp flap mechanically attaches, e.g., via a flap through-hole with a structurally reinforcing grommet, to a respective segment of a tether cable (e.g., wire, rope, strap, chain, etc.) of a cargo suspension system. In addition, each shoulder clamp cup includes multiple noncoplanar, mutually adjoining contact surfaces. For instance, the cup may have a tetrahedral geometry with three mutually orthogonal, triangular-shaped contact surfaces. One or more or all of the contact surfaces attach, e.g., via a high-strength adhesive, to a respective surface of a corner of a cargo container. Disclosed cargo mounting assemblies may be employed in both vehicular and non-vehicular applications alike.

Additional aspects of this disclosure are directed to aircraft equipped with payload suspension systems using corner attachment assemblies for securing payload containers. As used herein, the terms "aircraft" and "vehicle" and permutations thereof may be used interchangeably and synonymously to include any relevant vehicle platform, such as fixed-wing aircraft, rotary-wing aircraft, VTOL aircraft, airships, and UAVs, including manned, unmanned, and fully or partially autonomous variants thereof. In an example, an aircraft includes a load-bearing airframe with landing gear, rotor assemblies and/or wings, optional propulsion and guidance systems, and other standard original equipment. The aircraft is also equipped with a cargo suspension system, which is attached to the airframe and includes a tether cable with optional winch.

Continuing with the discussion of the foregoing example, the aircraft includes a cargo mounting assembly (also referred to as "corner attachment assembly" in aircraft applications) for securing the cargo container to the tether cable. The cargo mounting assembly includes a single or multiple pairs of shoulder clamps, with each pair composed of first and second shoulder clamps. The first shoulder clamp has a respective flap that projects from a respective cup. The first shoulder clamp flap is attached (e.g., via hook or threaded engagement) to a distinct segment of the tether cable. The first shoulder clamp cup includes multiple noncoplanar, mutually adjoining contact surfaces. At least one of these contact surfaces attaches (e.g., via adhesive, double-sided tape, fastener, etc.) to a respective surface of a corner of the cargo container. Like the first shoulder clamp, the second shoulder clamp has a respective flap that projects from a respective cup. The second shoulder clamp's flap is attached to a different section of the tether cable; in so doing, the tether cable interconnects the first shoulder clamp to the second shoulder clamp and distributes the cargo weight in a manner that improves the attachment of the cups to the container. The second shoulder clamp's cup includes multiple noncoplanar, mutually adjoining contact surfaces, at least one of which attaches (e.g., via adhesive, double-sided tape, fastener, etc.) to a respective surface of a diagonally opposite corner of the container.

Further aspects of this disclosure are directed to methods for making and methods for using any of the disclosed cargo mounting assemblies, suspension systems, and/or aircraft. For instance, a method is presented for mounting an object to a tether cable of a suspension system. This representative method includes, in any order and in any combination with any of the above and below disclosed options and features: positioning, on a first corner of the object, a first shoulder clamp with a first flap projecting from a first cup, the first flap being configured to mechanically attach to a first segment of the tether cable, and the first cup including multiple noncoplanar mutually adjoining first contact surfaces; adhering at least one of the first contact surfaces to a respective surface of the first corner; positioning, on a second corner of the object, a second shoulder clamp with a second flap projecting from a second cup, the second flap being configured to mechanically attach to a second segment of the tether cable, and the second cup including multiple noncoplanar mutually adjoining second contact surfaces; and, adhering at least one of the second contact surfaces to a respective surface of the second corner.

For any of the disclosed systems, methods, and aircraft, the first cup may include a set of three (first) contact surfaces, and the second cup may include a set of three (second) contact surfaces. In this instance, each contact surface has at least two terminal edges, each of which adjoins a respective terminal edge of a neighboring contact surface. The first cup's contact surfaces may be mutually orthogonal, and the second cup's contact surfaces may be mutually orthogonal. As yet a further option, each cup contact surface may have a triangular shape. Optionally, the cups' contact surfaces may be substantially identical, sharing a common right-triangle geometry. The cargo container may have a polyhedral shape, and each of the shoulder clamp cups may have a tetrahedral shape.

For any of the disclosed systems, methods, and aircraft, an adhesive layer may be located on two or more of each shoulder cup's contact surfaces. Moreover, each of the shoulder clamp flaps may include a through-hole that receives therethrough a segment of the tether cable or an attachment device (e.g., hook, fastener, or latch) attached to the cable. These flap through-holes may be structurally reinforced with optional grommets or backing layers that attach to the flaps and partially or wholly circumscribe the holes. Each shoulder clamp may be fabricated from a plastic material or a paper material. In this regard, the first shoulder clamp, including the first flap and cup, may be fabricated as a first single-piece, unitary structure, and the second shoulder clamp, including the second flap and cup, may be fabricated as a second single-piece, unitary structure.

The above summary does not represent every embodiment or every aspect of this disclosure. Rather, the above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes any and all combinations and subcombinations of the elements and features presented above and below.

Figure 1:
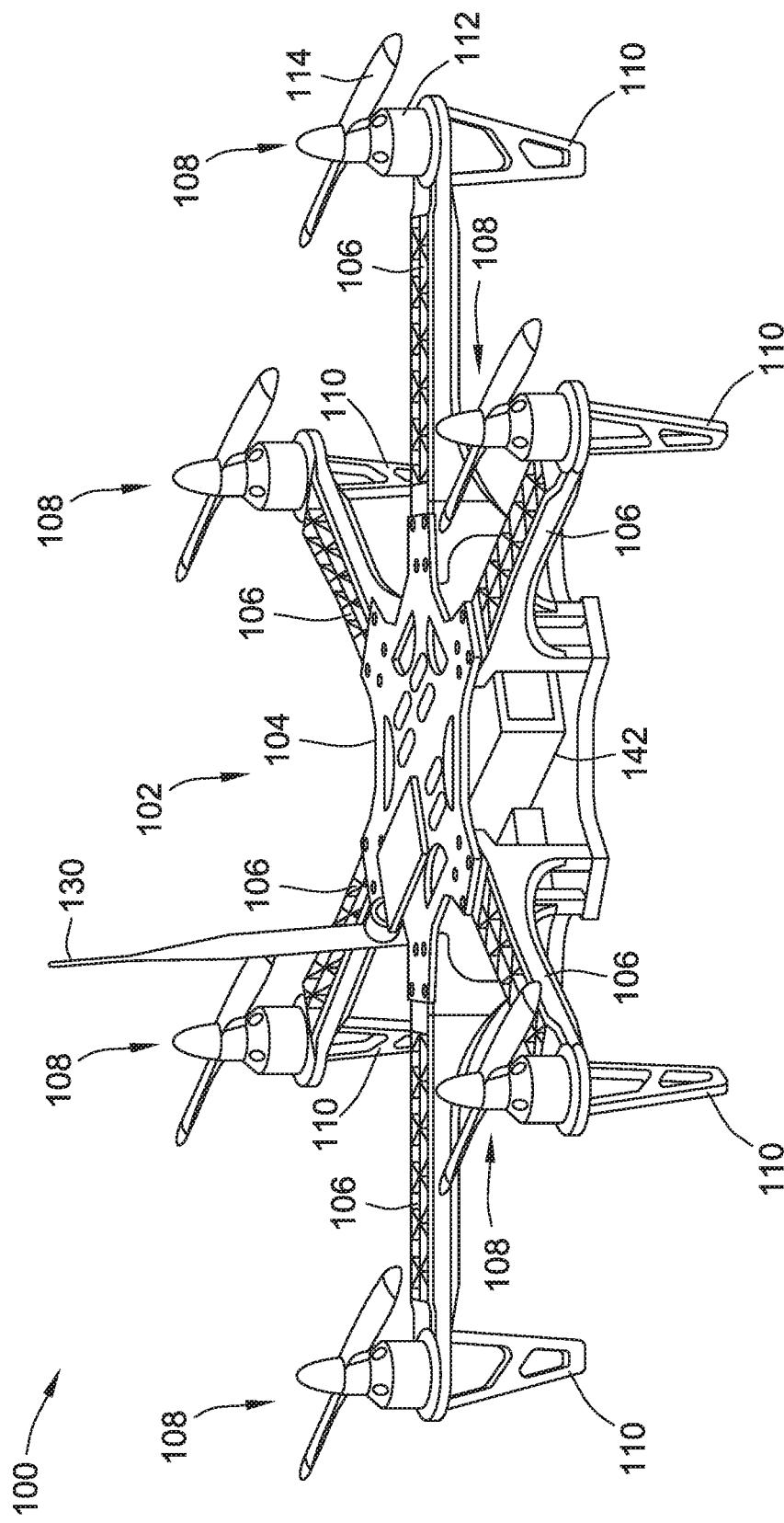
FIG. 1 is an elevated, perspective-view illustration of a representative aircraft with a payload suspension system in accordance with aspects of the present disclosure.

The present disclosure is amenable to various modifications and alternative forms, and some representative embodiments are shown by way of example in the drawings and will be described in detail below. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed, for example, by the appended claims.

DETAILED DESCRIPTION

This disclosure is susceptible of embodiment in many different forms. Representative examples of the disclosure are shown in the drawings and herein described in detail with the understanding that these embodiments are provided as an exemplification of the disclosed principles, not limitations of the broad aspects of the disclosure. To that end, elements and limitations that are described, for example, in the Abstract, Technical Field, Background, Summary, and Detailed Description sections, but not explicitly set forth in the claims, should not be incorporated into the claims, singly or collectively, by implication, inference or otherwise. Moreover, the drawings discussed herein are not necessarily to scale and are provided purely for instructional purposes.

Thus, the specific and relative dimensions shown in the drawings are not to be construed as limiting.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, front, back, left, right, etc., may be with respect to an aircraft that is operatively oriented in an upright position on a horizontal support surface.

Referring now to the drawings, wherein like reference numbers refer to like features throughout the several views, there is shown in FIG. 1 a representative aircraft, which is designated generally at 100 and portrayed herein for purposes of discussion as a multi-rotor vertical takeoff and landing unmanned aerial vehicle. The VTOL illustrated aircraft 100—also referred to herein as "vehicle" or "UAV" for brevity—is merely an exemplary application with which aspects and features of this disclosure may be practiced. In the same vein, incorporation of the present concepts into a human-controlled UAV should also be appreciated as an exemplary implementation of the concepts disclosed herein. As such, it will be understood that aspects of the present disclosure may be incorporated into manned and unmanned aerial vehicles, may be implemented for any logically relevant type of aircraft architecture (e.g., fixed-wing, rotary-wing, hybrid VTOL, etc.), and may be utilized in both vehicular and non-vehicular applications alike. Lastly, only select components have been shown and will be described in additional detail herein. Nevertheless, the systems, methods and aircraft discussed below may include numerous additional and alternative features, and other available peripheral components, for carrying out the various functions of this disclosure.

UAV 100 of FIG. 1 is shown as a cargo drone with a load-bearing airframe 102 that is generally composed of a central fuselage 104 and a circular array of (six) rotor booms 106. The horizontally oriented rotor booms 106 are circumferentially spaced around and extend in a radially outward direction from the fuselage 104. Projecting orthogonally from a terminal end of each boom 106 is a fixed skid-type landing gear 110. These landing gears 110 collectively buttress the UAV 100 when the vehicle is not in use as well as prior to takeoff and after landing operations. Also cantilevered to the fuselage 104 at the terminal ends of the booms 106 are motor-driven rotor assemblies 108. The fuselage 104, rotor booms 106, and landing gears 110 may be integrally formed as a single-piece, unitary structure, or manufactured as separate components that are securely coupled to one another. While a six-rotor (hexarotor) cargo drone is illustrated throughout the figures, the UAV 100 may take on alternative aircraft configurations and size classifications, may employ greater or fewer than six rotors, and may employ various control surfaces and lifting surfaces. In the same vein, the landing gears 110 may be greater or fewer than six, and may take on alternative locations and configurations from that shown in the Figures.

Figure 2:
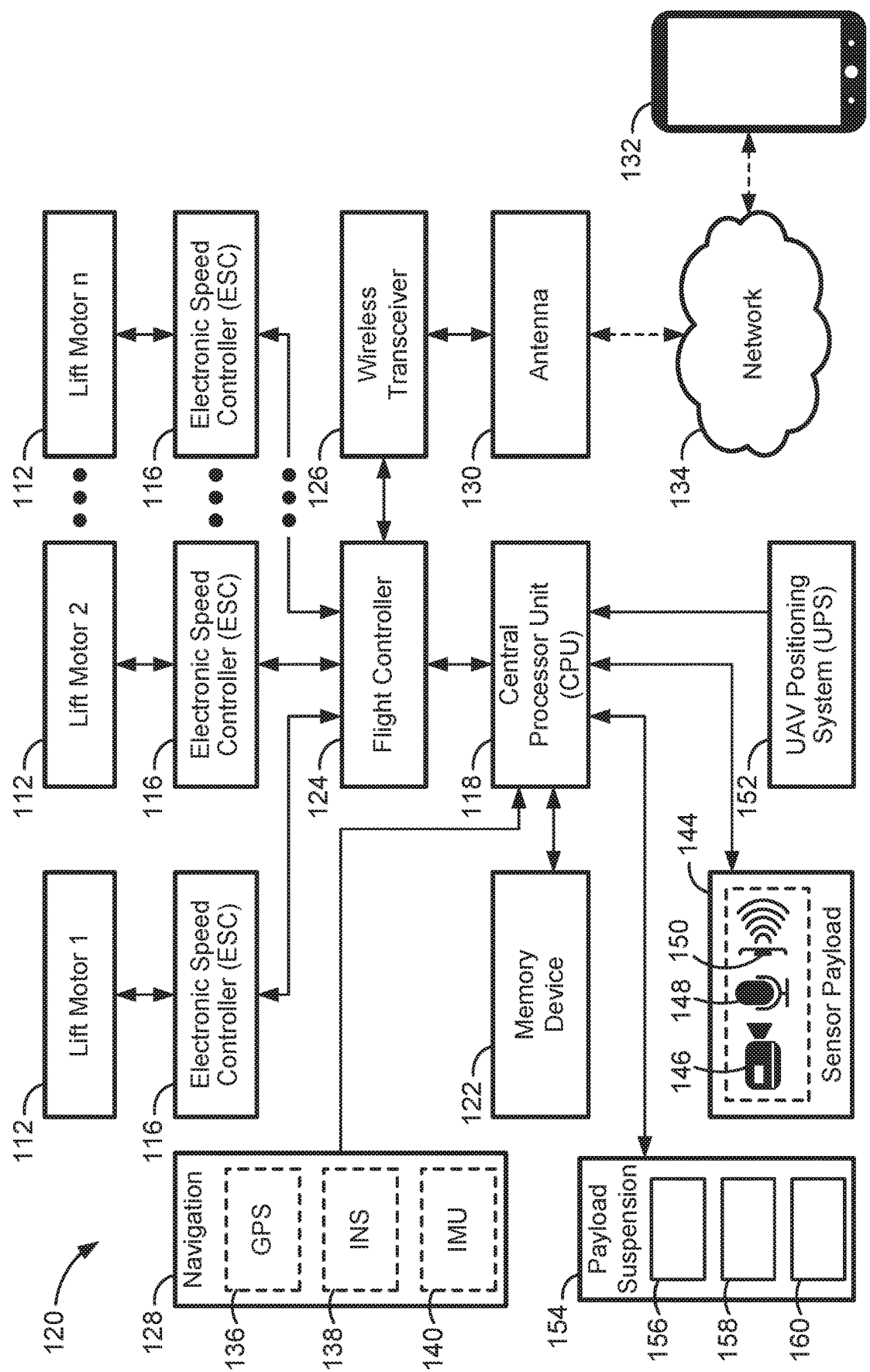
FIG. 2 is a schematic diagram illustrating the aircraft control system architecture of the representative aircraft of FIG. 1.

Rotor assemblies 108 of FIG. 1 may be operated individually, jointly, and in assorted combinations to provide lift and thrust to the UAV 100. Each rotor assembly 108 may be typified by a lift motor 112 that drives a dual-blade propeller assembly 114 mounted at a distal end of a mast shaft (not visible). These hingeless "simple" rotor assemblies 108 are each juxtaposed with a landing gear 110 at the distal end of a rotor boom 106 and vertically oriented to direct thrust forces downward relative to the airframe 102. The lift motors 112 may be embodied as brushless permanent magnet (PM) electric motors controlled via an electronic speed controller (ESC) 116 (FIG. 2). While shown packaged at the distal end of each boom 106, the six lift motors 112 (or a single, shared lift motor) may instead be located on the fuselage 104 of the airframe 102. As a further option, torque generated via a lift motor 112 may be transmitted to one or more propeller assemblies 114 via a gearbox or power-shifted transmission interposed between the motor 112 and propeller(s) 114.

FIG. 2 is a schematic diagram illustrating the architecture of an aircraft control system 120 for governing the vehicle components and associated operations of the UAV 100 of FIG. 1. As illustrated, the UAV 100 includes an aircraft central processing unit (CPU) 118 that is communicatively connected (wired or wirelessly) with a resident memory device 122, a flight controller 124, a wireless communications transceiver 126, and a navigation system 128. Control processor, control module, module, controller, processor unit, processor, and permutations thereof may be defined to include any one or various combinations of one or more of logic circuits, Application Specific Integrated Circuit(s) (ASIC), electronic circuit(s), central processing unit(s) (e.g., microprocessor(s)), input/output circuit(s) and devices, appropriate signal conditioning and buffer circuitry, and other components to provide the described functionality, etc. Associated memory and storage (e.g., read only, programmable read only, random access, hard drive, tangible, etc.), shown schematically at 122 in FIG. 2, whether resident, remote, or a combination of both, store processor-executable software, firmware programs, routines, etc.

Software, firmware, programs, instructions, routines, code, algorithms, and similar terms may be used interchangeably and synonymously to mean any processor-executable instruction sets, including calibrations and look-up tables. The aircraft CPU 118 may be designed with a set of control routines and logic executed to provide desired functionality. Control routines are executed, such as by a central processing unit, and are operable to monitor inputs from sensing devices and other networked control modules, and execute control and diagnostic routines to control operation of devices and actuators. Routines may be executed in real-time, continuously, systematically, sporadically and/or at regular intervals, for example, each 100 microseconds, 3.125, 6.25, 12.5, 25 and 100 milliseconds, etc., during ongoing use or operation of the system 120.

With continuing reference to FIG. 2, the wireless communications transceiver 126 is operatively coupled with an antenna 130 to exchange data between the UAV's CPU 118 and a human-machine interface (HMI) device 132, such as a smartphone, tablet computer, laptop computer, remote controller, or other control unit (e.g., a base station). As shown, the UAV 100 communicates data with the HMI device 132 over a wireless communications network 134. Network 134 may be any available type of network, including a combination of public distributed computing networks (e.g., Internet) and secured private networks (e.g., local area network, wide area network, virtual private network). It may also include wireless and wireline transmission systems (e.g., satellite, cellular network, terrestrial networks, etc.). In at least some aspects, most if not all data transaction functions carried out by the system 120 may be conducted over a wireless network, such as a wireless local area network (WLAN) or cellular data network, to ensure freedom of movement of the UAV 100 and HMI device 132. The HMI device 132 may facilitate monitoring and control of the UAV 100 and its payload(s).

Aircraft CPU 118 communicates with the ESC 116 via flight controller 124 to regulate operation of the rotor assemblies 108 in response to command signals from an operator, an autopilot system, a navigation system 128, or other system via the wireless transceiver 126. For at least some system architectures, the aircraft's CPU 118, memory device 122, flight controller 124, etc., may be discrete devices or may be integrated into a single component or circuit. In operation, the flight controller 124 dynamically—in real-time or near real-time—adjusts the thrust output from each of the rotor assemblies 108 on each rotor boom 106 during the various stages of flight (e.g., take-off, cruising, landing) via the ESC 116 to control three-dimensional (3D) motion, including vehicle propulsion, lift, roll, pitch, yaw, etc., of the UAV 100. In this regard, the flight controller 124 may be operable to independently and jointly control the individual lift motors 112 and thereby generate a desired lift thrust for each of the rotor assemblies 108. Propeller assembly 114 speed and, thus, rotor assembly 108 output may be controlled by modulating power supplied to each lift motor 112 from a resident rechargeable energy storage system (RESS), represented in FIG. 1 as a lithium-ion (Li-ion) or silicon-based Li-ion battery module 142 (FIG. 1) mounted inside the central fuselage 104.

UAV 100 may be equipped with optional resident (onboard) and/or remote (offboard) hardware to provision fully autonomous or partially automated flight operations. By way of example, the aircraft CPU 118 may communicate with a resident navigation system 128, which is generally composed of a Global Positioning System (GPS) module 136, an Inertial Navigation System (INS) module 138, and an Inertial Measurement Unit (IMU) module 140. IMU module 140 may include one or more gyros, accelerometers, magnetometers, etc., to determine vehicle orientation, angular rate, and g-force. The satellite-based GPS module 136 retrieves real-time geodetic data for the UAV 100, including absolute drift-free position values that may be used to reset an INS solution or may be fused with it by a Kalman Filter or other suitable mathematical technique. The navigation system 128 communicates inertial stabilization, GPS, and navigation data to the aircraft CPU 118, which may be used to facilitate automated and manual operation of the aircraft 100.

As indicated above, the UAV 100 may be scaled and customized for any of a variety of drone classifications. As shown, the UAV 100 of FIGS. 1 and 2 is adapted as a reconnaissance and logistics drone equipped with a sensor package payload 144 that provisions autonomous navigation, guidance, and control of the UAV 100, such as to enable monitoring, data collection, and cargo delivery. For instance, the sensor package payload 144 is generally composed of an optical sensor 146, an audio input/output (I/O) device 148, and other sensor array 150. Optical sensor 146 of FIG. 2 is an optical instrument for capturing and recording images and/or video. By comparison, the audio I/O device 148 is a sound transducer for transmitting and receiving audible data, and may comprise one or more microphones, echolocation sensors, ultrasonic sensing devices, voice recognition hardware/software, etc. Lastly, the sensor array 150 facilitates aircraft functionality and provides attendant data, and may include radar sensing, Doppler sensing, light detection and ranging (LIDAR) sensing, etc. sensor package payload 144 is securely mounted to the airframe 102 and communicates with the aircraft CPU 118, e.g., to assist with UAV navigation, speed, etc. In addition, the sensor package payload 144 may be rotatably and pivotally coupled to, for example, an underside surface of the airframe 102 via a payload-stabilizing gimbal system to enable the sensor package payload 144 to be more easily oriented to monitor objects below and/or on the ground.

As another example of optional vehicle hardware, the aircraft CPU 118 may be operatively coupled with a UAV Positioning System (UPS) module 152 operable for real-time vehicle location, e.g., in scenarios in which GPS is unavailable or failed. The UPS module 152 measures UAV 100 position within an environment based on sensor readings and/or memory-stored navigational maps, which may be retrieved by or loaded and stored to the UAV 100 (e.g., in cache memory of memory device 122). The UPS module 152 may include, or be communicatively coupled with, various sensors, such as motion capture sensors, radio-beacons, infrared sensors, acoustic sensors, etc. In certain aspects, the UPS module 152 may employ sensor data from the sensor package payload 144 to determine the UAV 100 position within a given operating environment.

As a logistics-class drone, the UAV 100 may be equipped with a payload suspension system 154 for selectively loading, airlifting, and discharging cargo, such as a payload container. The illustrated suspension system 154 of FIG. 2 is generally typified by an electric winch 156 that is actively controlled by a servomotor 158 to raise and lower a tether cable 160. A payload may be detachably coupled, as explained below, to an extendable end of the tether cable 160; the electric winch 156 may be driven via the servomotor 158 to wind and unwind the cable 160 and thereby raise and lower the payload for transport and delivery. After the payload is secured to the tether cable 160 using a suitable attachment mechanism, such as a releasable hook, and a corner attachment assembly, such as those described below with respect to FIGS. 3 and 4, the UAV 100 may travel by flight to a delivery zone. During flight, the payload's displacement from the airframe 104 may be systematically modulated to minimize load sway and oscillation. When the UAV 100 lands at or hovers above the delivery zone, the tether cable 160 may be extended to thereby lower the payload from the UAV 100; the payload may be automatically or manually released from the payload suspension system 154 at the delivery zone. Alternatively, the payload may be controllably released by the tether cable 160 and thereby jettisoned from the payload suspension system 154 while the UAV 100 is in flight.

Figure 3:
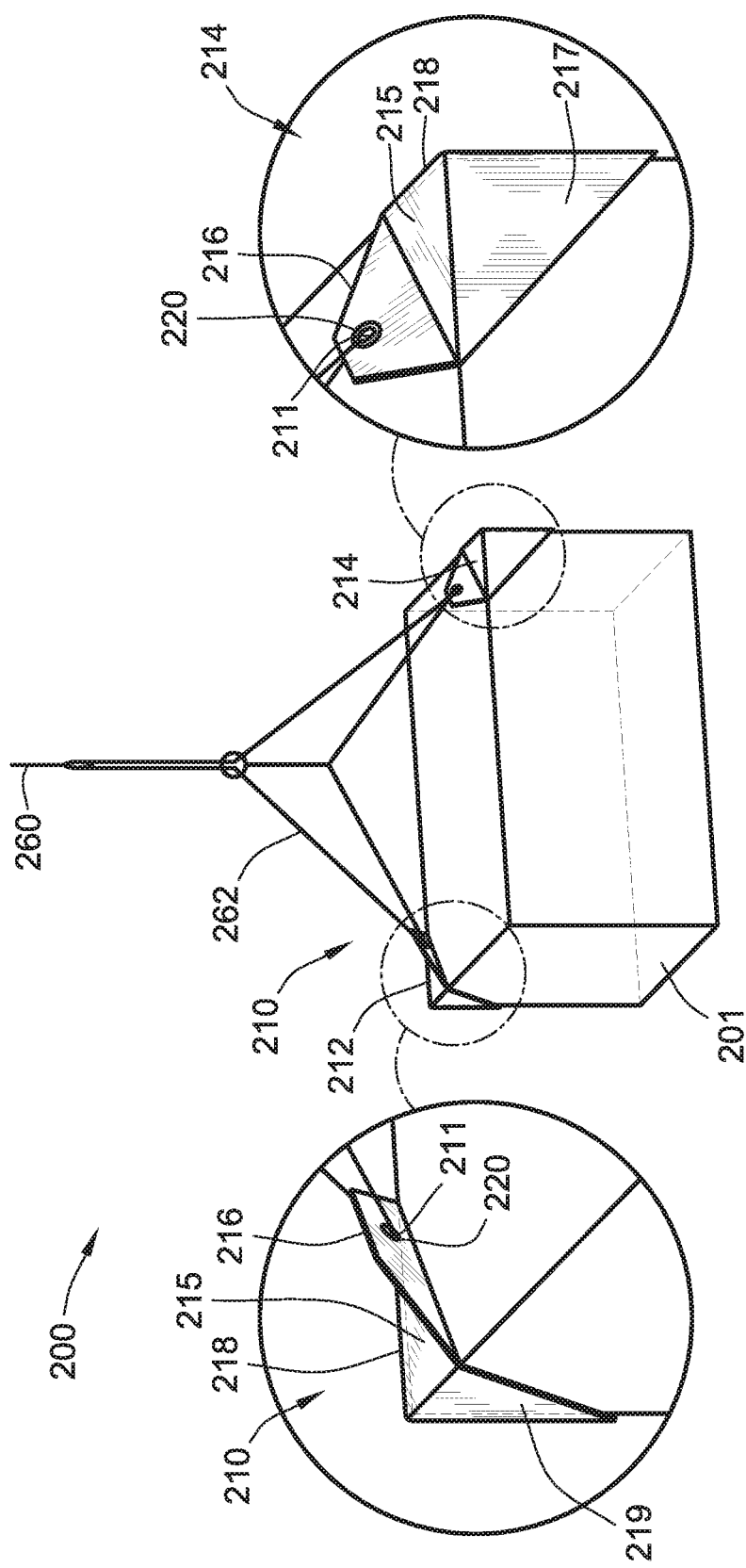
FIG. 3 is an elevated, perspective-view illustration of a representative corner attachment assembly mounting a cargo container to a tether cable of a cargo suspension system in accord with aspects of the disclosed concepts.
Figure 4:
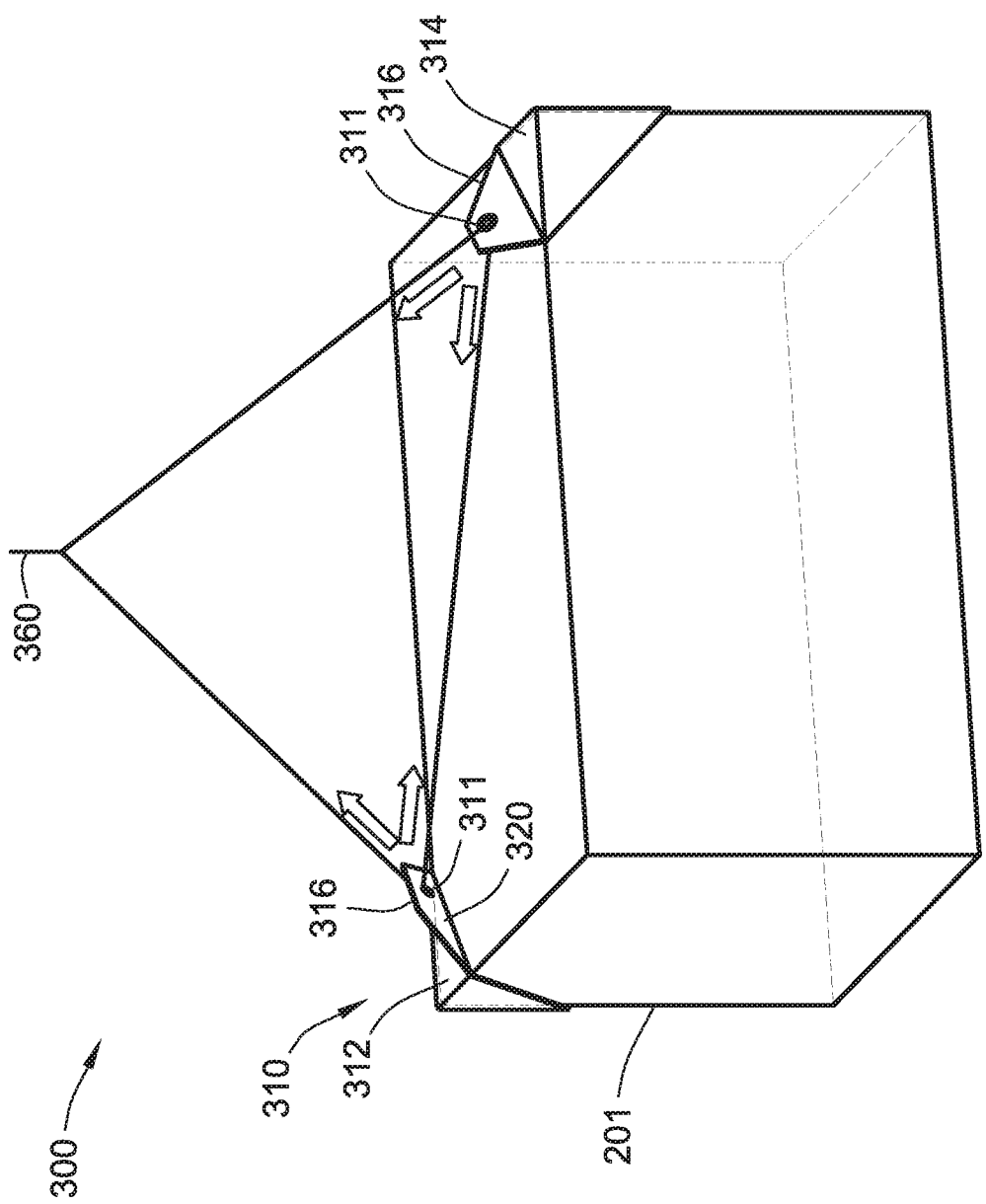
FIG. 4 is an elevated, perspective-view illustration of another representative corner attachment assembly mounting a cargo container to an alternative tether cable configuration in accord with aspects of the disclosed concepts.

Turning next to FIGS. 3 and 4, there are shown two examples of cargo suspension and mounting (CSM) systems—designated generally at 200 (FIG. 3) and 300 (FIG. 4)—for securing a cargo container 201 or other object to an aircraft (e.g., UAV 100 of FIGS. 1 and 2) or an overhead support, such as a crane, gantry, or truss system. In this regard, it is envisioned that the CSM systems 200 and 300 of FIGS. 3 and 4 may be utilized by the UAV 100 of FIGS. 1 and 2; as such, features and options disclosed herein with reference to the payload suspension system 154 may be incorporated, singly or in any combination, into the CSM systems 200 and 300, and vice versa. As a point of similarity, both of the cargo suspension and mounting systems 200 and 300 include a drop-down tether cable 260 and 360, respectively, with a bottom-most, distal end to which is secured the cargo container 201. The cargo container 201 may detachably secure directly to the tether cable 360, as shown in FIG. 4, or may employ an attachment device to operatively attach to the tether cable 260, such as a hook, clamp, fastener, jib line 262 of FIG. 3, or other suitable mechanism.

In order to secure the cargo container 201 to the CMS system 200, 300, a cargo mounting assembly 210 and 310 (also referred to herein as "corner attachment assembly") detachably couples the cargo container 201 to the tether cable 260, 360. The representative cargo mounting assemblies 210, 310 include at least one pair of shoulder clamps, with a given pair composed of a left (first) shoulder clamp 212 (FIG. 3) and 312 (FIG. 4) and a right (second) shoulder clamp 214 (FIG. 3) and 314 (FIG. 4), each of which affixes to a distinct corner of the cargo container 201. While shown in the Figures with a single pair of clamps mounted to upper-left and upper-right corners, which are diagonally opposite each other on the top of the container 201, it should be appreciated that the CMS systems 200, 300 may employ multiple pairs of clamps, with the individual clamps mounted in assorted arrangements to any of the corners of the cargo container 201. Moreover, the cargo container 201 is portrayed as a right-rectangular octahedron constructed of single-wall corrugated cardboard; however, the container 201 may take on innumerable alternative shapes, sizes, and materials within the scope of this disclosure.

For ease of design and simplicity of manufacture, the illustrated shoulder clamps 212, 214, 312, 314 may be substantially identical in construction and functionality; as such, for purposes of brevity and conciseness, all four shoulder clamps 212, 214, 312, 314 are described below with reference to one or both shoulder clamps 212, 214 that are enlarged in the inset views of FIG. 3. By way of non-limiting example, every clamp includes two primary segments: a flap 216 portion that adjoins and projects outward from a cup 218 portion. It may be desirable, for at least some configurations, that each shoulder clamp 212—including its flap 216 and cup 218 portions—be fabricated as a one-piece, unitary structure. A shoulder clamp 212, for example, may be cast or stamped and machined from a metallic material, blow molded or 3D printed from a polymeric material, or cut and folded from a cardboard-based paper material, as described below with respect to FIG. 5. Furthermore, the cup 218 is shown with a hollow, tetrahedral shape, and the flap 216 is shown with a flat, quadrilateral or rectangular shape; it should be appreciated, however, that the flap 216 and cup 218 may take on additional geometries and, optionally, may be scaled to size for alternative applications.

The flap 216 portions mechanically attach to the tether cable 260 and, by this means, suspend the shoulder clamps 212, 214 and cargo container 201 from an overhead support structure, such as payload suspension system 154 of UAV 100. According to the system architecture illustrated in FIG. 3, the flap 216 of the left (first) shoulder clamp 212 includes a through-hole 211 that threads therethrough one segment of the jib line 262, while the flap 216 of the right (second) shoulder clamp 214 includes a through-hole 211 that threads therethrough another segment of the jib line 262. To ensure the integrity of the mechanical connection between the shoulder clamps 212, 214 and jib line 262, a metallic or polymeric grommet 220 is seated within and structurally reinforces each through-hole 211 of FIG. 3. By comparison, the flap 316 of the left shoulder clamp 312 in FIG. 4 includes a through-hole 311 that threadably receives a left section of the tether cable 360, while the flap 316 of the right shoulder clamp 314 includes a through-hole that threadably receives a distinct right section of the tether cable 360. To ensure the integrity of the mechanical connection between the shoulder clamps 312, 314 and cable 360, a wear-resistant and resilient backing layer 320 is laminated to one face of the flap 316 and structurally reinforces each through-hole 311 of FIG. 4. While shown threadably receiving the cables 260, 360, it should be appreciated that the shoulder clamps 212, 214, 312, 314 may fixedly attach via alternative means, such as hooks, straps, chains, etc.

Fixated to opposing corners of the cargo container 201, the cup 218 portions rigidly couple the shoulder clamps 212, 214 to the cargo container 201 in a manner that ensures secure attachment of the container 201, e.g., for airlift and delivery via UAV 100 and payload suspension system 154. Each clamp cup 218 may be fabricated as a bipartite, tripartite, quadripartite, etc., construction with two or more noncoplanar, mutually adjoining contact surfaces. In accord with the illustrated example, the cup 218 consists generally of three contact surfaces—first, second and third contact surfaces 215, 217 and 219, respectively—that are attached to and orthogonal with one another. For such tripartite designs with three perpendicular contact surfaces, each contact surface 215, 217, 219 has at least two terminal edges that each adjoins a respective terminal edge of a neighboring contact surface 215, 217, 219. By way of example, and not limitation, the contact surfaces 215, 217, 219 of FIG. 3 are the interior faces of substantially flat, triangular panels. For at least some implementations, it may be desirable that the triangular shapes of the contact surfaces 215, 217, 219 share a common right-triangle geometry and, thus, have a common surface area and perimeter length. In this instance, the top (first) contact surface 215 has three terminal edges, two of which are mutually orthogonal; the two perpendicular edges each adjoins the terminal edge of a front/back-side (second) contact surface 217 or a left/right-side (third) contact surface 219. Likewise, each side surface 217, 219 has three terminal edges, two of which are mutually orthogonal; the two perpendicular edges of contact surfaces 217, 219 each adjoins the terminal edge of the top (first) contact surface 215 or a side (second or third) contact surface 217, 219.

At least two of the contact surfaces 215, 217, 219 of each shoulder clamp cup 218 is rigidly attached to a respective exterior surface of a corner of the cargo container 201. In FIG. 3, the two side surfaces 217, 219 are adhered directly to a distinct outer face of the container 201, e.g., via a high-strength, pressure-sensitive adhesive (PSA) with a carrying capacity of at least about 150 lbs. and a relatively high dynamic shear strength and peel resistance. By comparison, all three contact surfaces 215, 217, 219 of the shoulder clamps 312 and 314 of FIG. 4 are adhered directly to a distinct outer face of the container 201. With this architecture, the container's weight is transmitted through the shoulder clamps and distributed through the tether cable in a manner that "cinches" the cup portions to the container. Alternative configurations may employ reactive and non-reactive adhesives, as well as mechanical means of attachment, such as fasteners, rivets, clips, etc., to permanently or releasably attach to the shoulder clamps to the object. It should be appreciated that the contact surfaces 215, 217, 219 may take on alternative shapes and sizes, and may be oriented at any functional angle with respect to one another, e.g., to accommodate objects of varying shapes and sizes. It may be desirable, for at least some implementations, that only the two side surfaces 217, 219 be adhered to the container 201. Furthermore, the clamps may be releasably attached to a payload.

Figure 5:
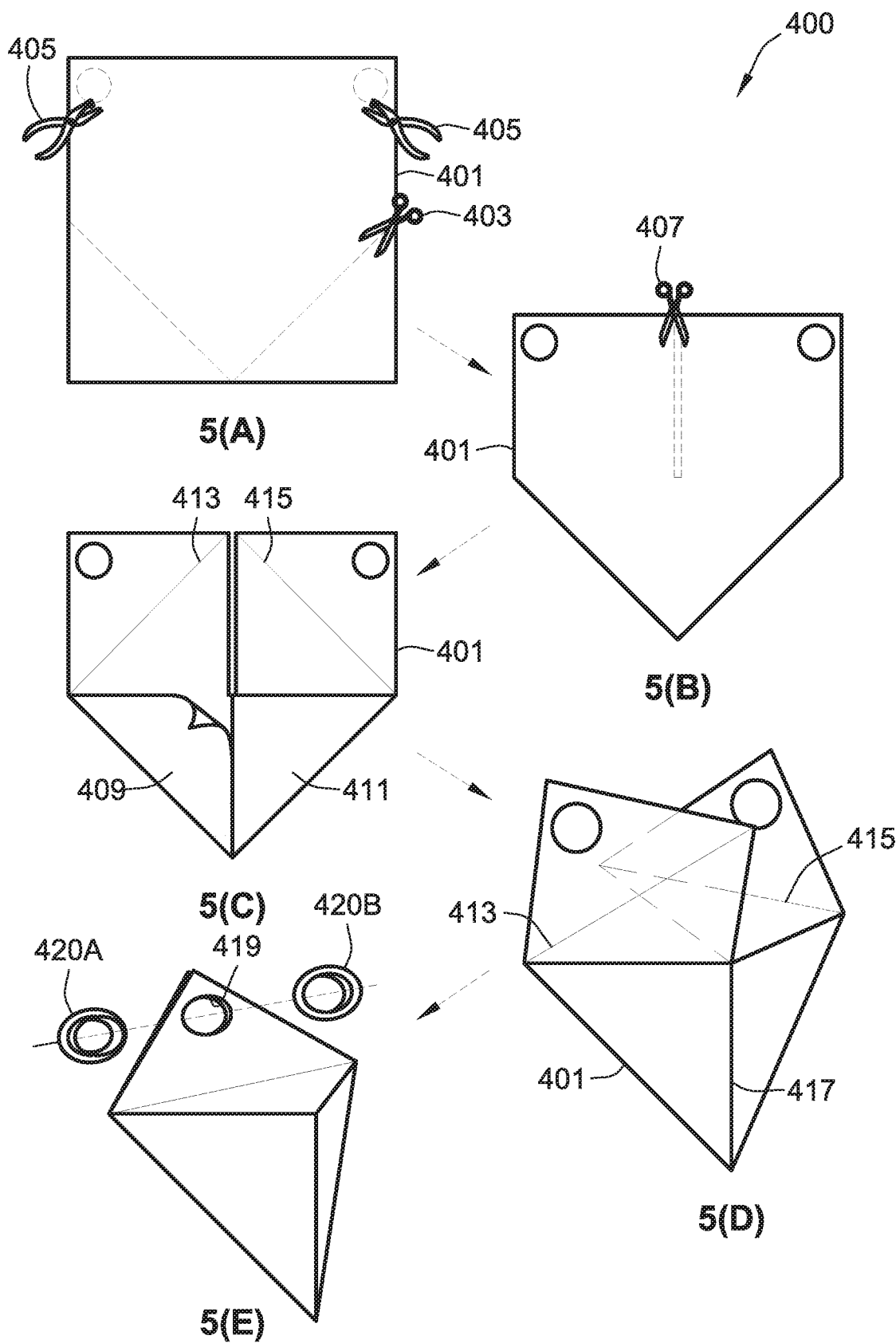
FIG. 5 is a workflow diagram illustrating a representative method of fabricating a shoulder clamp from a cardboard blank in accord with aspects of the disclosed concepts.

With reference now to FIG. 5, there is shown a workflow diagram for a representative method 400 of manufacturing a shoulder clamp of a cargo mounting assembly, such shoulder clamps 212, 214 of FIG. 3. Some or all of the operations illustrated in FIG. 5, and described in further detail below, may be representative of an algorithm that corresponds to processor-executable instructions that may be stored, for example, in main or auxiliary or remote memory, and executed, for example, by a resident or remote controller, central processing unit, control logic circuit, or other module or device or network of devices, to perform any or all of the below described functions associated, with, e.g., an automated manufacturing process. It should be recognized that the order of execution of some of the illustrated operations may be changed, additional operations may be added, and some of the operations described may be modified, combined, or eliminated.

Method 400 begins at manufacturing operation 5(A), whereat a cardboard blank 401 is retrieved from a stack of blanks or cut from a roll of sheet stock, e.g., by a material handling robot or an operator. Once the blank is pulled from supply, two triangular sections are cut from the bottom-left (first) and bottom-right (second) corners of the blank 401, as indicated by the scissors 403. Contemporaneous with this cutting operation, two holes are punched from the top-left (first) and top-right (second) corners of the blank 401, as indicated by the hole-punches 405. After the punched and cutaway scrap materials are discarded, method 400 advances to manufacturing operation 5(B) and a rectilinear cut is made down the center of the blank 401, as indicated by the scissors 407. This cut extends approximately halfway across the vertical length of the blank 401, interposed between the two holes punched at step 5(A).

At manufacturing operation 5(C), a first adhesive layer 409 is applied to a bottom-left (first) triangular segment of the blank 401, and a second adhesive layer 411 is applied to a bottom-right (second) triangular segment of the blank 401. Optional diagonal prefolds 413 and 415 may be bent into the top-left (first) and top-right (second) corners, respectively, of the blank 401. Method 400 thereafter proceeds to manufacturing operation 5(D) and folds the blank 401 along diagonal prefolds 413 and 415 and a vertical fold line 417 such that the punch holes coaxially overlap and the bottom-left (first) and bottom-right (second) triangular segments of the blank 401 are substantially perpendicular to each other. Opposing halves 420A and 420B of a structurally reinforcing grommet are mated within a through-hole 419, at manufacturing operation 5(E).

Further, the disclosure comprises embodiments according to the following clauses:

Clause 1: an object mounting assembly for securing an object to a tether cable of a suspension system, the object having a first corner opposite a second corner, the object mounting assembly comprising: a first shoulder clamp with a first flap projecting from a first cup, the first flap being configured to mechanically attach to a first segment of the tether cable, and the first cup including multiple noncoplanar mutually adjoining first contact surfaces, at least one of the first contact surfaces being configured to adhere to a respective surface of the first corner of the object; and a second shoulder clamp with a second flap projecting from a second cup, the second flap being configured to mechanically attach to a second segment of the tether cable, and the second cup including multiple noncoplanar mutually adjoining second contact surfaces, at least one of the second contact surfaces being configured to adhere to a respective surface of the second corner of the object.

Clause 2: the object mounting assembly of clause 1, wherein the first contact surfaces of the first cup include a set of three first contact surfaces, each of the first contact surfaces having two terminal edges each adjoining a respective terminal edge of a neighboring one of the first contact surfaces, and wherein the second contact surfaces of the second cup include a set of three second contact surfaces, each of the second contact surfaces having two terminal edges each adjoining a respective terminal edge of a neighboring one of the second contact surfaces.

Clause 3: the object mounting assembly of clause 2, wherein the three first contact surfaces are mutually orthogonal, and wherein the three second contact surfaces are mutually orthogonal.

Clause 4: the object mounting assembly of clauses 2 or 3, wherein each of the first contact surfaces has a first triangular shape and each of the second contact surfaces has a second triangular shape.

Clause 5: the object mounting assembly of clause 4, wherein the first triangular shapes and the second triangular shapes are coterminous and share a common right-triangle geometry.

Clause 6: the object mounting assembly of clauses 4 or 5, wherein the object has a polyhedral shape, the first cup has a first tetrahedral shape, and the second cup has a second tetrahedral shape.

Clause 7: the object mounting assembly of any one of clauses 1 to 6, further comprising a first adhesive layer located on two or more of the first contact surfaces, and a second adhesive layer located on two or more of the second contact surfaces.

Clause 8: the object mounting assembly of any one of clauses 1 to 7, wherein the first flap includes a first through-hole configured to receive the first segment of the tether cable or a first attachment device attached thereto, and the second flap includes a second through-hole configured to receive the second segment of the tether cable or a second attachment device attached thereto.

Clause 9: the object mounting assembly of clause 8, wherein the first flap includes a first grommet seated in the first through-hole, and the second flap includes a second grommet seated in the second through-hole.

Clause 10: the object mounting assembly of clauses 8 or 9, wherein the first flap includes a first backing layer structurally reinforcing the first through-hole, and the second flap includes a second backing layer structurally reinforcing the second through-hole.

Clause 11: the object mounting assembly of any one of clauses 1 to 10, wherein the first shoulder clamp and the second shoulder clamp are fabricated from a plastic material or a paper material.

Clause 12: the object mounting assembly of any one of clauses 1 to 12, wherein the first shoulder clamp, including the first flap and the first cup, is a first single-piece structure, and the second shoulder clamp, including the second flap and the second cup, is a second single-piece structure.

Clause 13: an aircraft comprising: an airframe; a rotor assembly and/or a pair of wings attached to the airframe; a cargo suspension system attached to the airframe and including a tether cable configured to detachably couple thereto a cargo container; and a cargo mounting assembly including: a first shoulder clamp with a first flap projecting from a first cup, wherein the first flap is attached to a first segment of the tether cable, and the first cup includes multiple noncoplanar mutually adjoining first contact surfaces, at least one of the first contact surfaces being configured to attach to a respective surface of a first corner of the cargo container; and a second shoulder clamp with a second flap projecting from a second cup, wherein the second flap is attached to a second segment of the tether cable thereby connecting the second shoulder clamp to the first shoulder clamp, and the second cup includes multiple noncoplanar mutually adjoining second contact surfaces, at least one of the second contact surfaces being configured to attach to a respective surface of a second corner of the cargo container diagonally opposite the first corner.

Clause 14: a method of mounting an object to a tether cable of a suspension system, the object having a first corner opposite a second corner, the method comprising: positioning, on the first corner of the object, a first shoulder clamp with a first flap projecting from a first cup, the first flap being configured to mechanically attach to a first segment of the tether cable, and the first cup including multiple noncoplanar mutually adjoining first contact surfaces; adhering each of the first contact surfaces to a respective surface of the first corner; positioning, on the second corner of the object, a second shoulder clamp with a second flap projecting from a second cup, the second flap being configured to mechanically attach to a second segment of the tether cable, and the second cup including multiple noncoplanar mutually adjoining second contact surfaces; and adhering each of the second contact surfaces to a respective surface of the second corner.

Clause 15: the method of clause 14, wherein the first contact surfaces of the first cup include a set of three first contact surfaces, each of the first contact surfaces having two terminal edges each adjoining a respective terminal edge of a neighboring one of the first contact surfaces, and wherein the second contact surfaces of the second cup include a set of three second contact surfaces, each of the second contact surfaces having two terminal edges each adjoining a respective terminal edge of a neighboring one of the second contact surfaces.

Clause 16: the method of clause 15, wherein the first contact surfaces are mutually orthogonal, and wherein the second contact surfaces are mutually orthogonal, and wherein each of the first contact surfaces has a first triangular shape and each of the second contact surfaces has a second triangular shape.

Clause 17: the method of any one of clauses 14 to 16, wherein the first shoulder clamp further includes a first adhesive layer located on two or more of the first contact surfaces, and the second shoulder clamp further includes a second adhesive layer located on two or more of the second contact surfaces.

Clause 18: the method of any one of clauses 14 to 17, wherein the first flap includes a first through-hole configured to receive the first segment of the tether cable or a first attachment device attached thereto, and the second flap includes a second through-hole configured to receive the second segment of the tether cable or a second attachment device attached thereto.

Clause 19: the method of any one of clauses 14 to 18, wherein the first shoulder clamp and the second shoulder clamp are molded or printed from a polymeric material or are cut or stamped and folded from flat paper blanks.

Clause 20: the method of any one of clauses 14 to 19, wherein the first shoulder clamp, including the first flap and the first cup, is produced as a first single-piece structure, and the second shoulder clamp, including the second flap and the second cup, is produced as a second single-piece structure.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. An object mounting assembly for securing an object to a tether cable of a suspension system, the object having a first corner opposite a second corner, the object mounting assembly comprising:
   a first shoulder clamp with a first flap projecting from a first cup, the first flap being configured to mechanically attach to a first segment of the tether cable, and the first cup including multiple noncoplanar mutually adjoining first contact surfaces, at least one of the first contact surfaces being configured to adhere to a respective surface of the first corner of the object; and
   a second shoulder clamp with a second flap projecting from a second cup, the second flap being configured to mechanically attach to a second segment of the tether cable, and the second cup including multiple noncoplanar mutually adjoining second contact surfaces, at least one of the second contact surfaces being configured to adhere to a respective surface of the second corner of the object.

2. The object mounting assembly of claim 1, wherein the first contact surfaces of the first cup include a set of three first contact surfaces, each of the first contact surfaces having two terminal edges each adjoining a respective terminal edge of a neighboring one of the first contact surfaces, and wherein the second contact surfaces of the second cup include a set of three second contact surfaces, each of the second contact surfaces having two terminal edges each adjoining a respective terminal edge of a neighboring one of the second contact surfaces.

3. The object mounting assembly of claim 2, wherein the three first contact surfaces are mutually orthogonal, and wherein the three second contact surfaces are mutually orthogonal.

4. The object mounting assembly of claim 2, wherein each of the first contact surfaces has a first triangular shape and each of the second contact surfaces has a second triangular shape.

5. The object mounting assembly of claim 4, wherein the first triangular shapes and the second triangular shapes are coterminous and share a common right-triangle geometry.

6. The object mounting assembly of claim 4, wherein the object has a polyhedral shape, the first cup has a first tetrahedral shape, and the second cup has a second tetrahedral shape.

7. The object mounting assembly of claim 1, further comprising a first adhesive layer located on two or more of the first contact surfaces, and a second adhesive layer located on two or more of the second contact surfaces.

8. The object mounting assembly of claim 1, wherein the first flap includes a first through-hole configured to receive the first segment of the tether cable or a first attachment device attached thereto, and the second flap includes a second through-hole configured to receive the second segment of the tether cable or a second attachment device attached thereto.

9. The object mounting assembly of claim 8, wherein the first flap includes a first grommet seated in the first through-hole, and the second flap includes a second grommet seated in the second through-hole.

10. The object mounting assembly of claim 8, wherein the first flap includes a first backing layer structurally reinforcing the first through-hole, and the second flap includes a second backing layer structurally reinforcing the second through-hole.

11. The object mounting assembly of claim 1, wherein the first shoulder clamp and the second shoulder clamp are fabricated from a plastic material or a paper material.

12. The object mounting assembly of claim 1, wherein the first shoulder clamp, including the first flap and the first cup, is a first single-piece structure, and the second shoulder clamp, including the second flap and the second cup, is a second single-piece structure.

13. An aircraft comprising:
an airframe;
a rotor assembly and/or a pair of wings attached to the airframe;
a cargo suspension system attached to the airframe and including a tether cable configured to detachably couple thereto a cargo container; and
a cargo mounting assembly including:
a first shoulder clamp with a first flap projecting from a first cup, wherein the first flap is attached to a first segment of the tether cable, and the first cup includes multiple noncoplanar mutually adjoining first contact surfaces, at least one of the first contact surfaces being configured to attach to a respective surface of a first corner of the cargo container; and
a second shoulder clamp with a second flap projecting from a second cup, wherein the second flap is attached to a second segment of the tether cable thereby connecting the second shoulder clamp to the first shoulder clamp, and the second cup includes multiple noncoplanar mutually adjoining second contact surfaces, at least one of the second contact surfaces being configured to attach to a respective surface of a second corner of the cargo container diagonally opposite the first corner.

14. A method of mounting an object to a tether cable of a suspension system, the object having a first corner opposite a second corner, the method comprising:
positioning, on the first corner of the object, a first shoulder clamp with a first flap projecting from a first cup, the first flap being configured to mechanically attach to a first segment of the tether cable, and the first cup including multiple noncoplanar mutually adjoining first contact surfaces;
adhering each of the first contact surfaces to a respective surface of the first corner;
positioning, on the second corner of the object, a second shoulder clamp with a second flap projecting from a second cup, the second flap being configured to mechanically attach to a second segment of the tether cable, and the second cup including multiple noncoplanar mutually adjoining second contact surfaces; and
adhering each of the second contact surfaces to a respective surface of the second corner.

15. The method of claim 14, wherein the first contact surfaces of the first cup include a set of three first contact surfaces, each of the first contact surfaces having two terminal edges each adjoining a respective terminal edge of a neighboring one of the first contact surfaces, and wherein the second contact surfaces of the second cup include a set of three second contact surfaces, each of the second contact surfaces having two terminal edges each adjoining a respective terminal edge of a neighboring one of the second contact surfaces.

16. The method of claim 15, wherein the first contact surfaces are mutually orthogonal, and wherein the second contact surfaces are mutually orthogonal, and wherein each of the first contact surfaces has a first triangular shape and each of the second contact surfaces has a second triangular shape.

17. The method of claim 14, wherein the first shoulder clamp further includes a first adhesive layer located on two or more of the first contact surfaces, and the second shoulder clamp further includes a second adhesive layer located on two or more of the second contact surfaces.

18. The method of claim 14, wherein the first flap includes a first through-hole configured to receive the first segment of the tether cable or a first attachment device attached thereto, and the second flap includes a second through-hole configured to receive the second segment of the tether cable or a second attachment device attached thereto.

19. The method of claim 14, wherein the first shoulder clamp and the second shoulder clamp are molded or printed from a polymeric material or are cut or stamped and folded from flat paper blanks.

20. The method of claim 14, wherein the first shoulder clamp, including the first flap and the first cup, is produced as a first single-piece structure, and the second shoulder clamp, including the second flap and the second cup, is produced as a second single-piece structure.

* * * * *